United States Patent [19]

Kowalski

[11] 4,305,677
[45] Dec. 15, 1981

[54] CONNECTOR

[75] Inventor: Joseph W. Kowalski, Florissant, Mo.

[73] Assignee: B-Line Systems, Inc., Highland, Ill.

[21] Appl. No.: 81,654

[22] Filed: Oct. 4, 1979

[51] Int. Cl.³ .............................................. F16D 1/00
[52] U.S. Cl. .................................. 403/295; 403/205; 403/362
[58] Field of Search ............... 403/292, 297, 295, 362, 403/402, 205; 151/41.76; 85/1 SS

[56] References Cited

U.S. PATENT DOCUMENTS

| | | | |
|---|---|---|---|
| 2,463,796 | 3/1949 | O'Rourke | 403/292 |
| 2,844,233 | 7/1958 | Westman | 403/295 |
| 3,017,206 | 1/1962 | Johnson | 85/1 SS |
| 3,900,269 | 8/1975 | Pavlot | 403/292 |

Primary Examiner—Andrew V. Kundrat
Attorney, Agent, or Firm—Senniger, Powers, Leavitt and Roedel

[57] ABSTRACT

A connector for a channel having a web and side flanges with inwardly turned, hook-shaped lips defining a slot therebetween. The connector comprises a channel-shaped connecting member having a pair of side walls with longitudinally extending edges and a connecting wall having a circular opening therein. The connector further comprises a relatively flat thin round screw member threaded in the opening and having opposing end faces of substantially the same diameter, the screw member being threaded substantially from one end face to the other. The member is axially inserted inside the channel with the open side of the member toward the channel slot to a position in which the side walls of the member are adjacent and parallel to the side flanges of the channel with the longitudinally extending edges of the side walls spaced from but adjacent to the lips of the channel, and in which the connecting wall is adjacent and generally parallel to the web of the channel with the screw member in position for engagement of one end face thereof with the web of the channel on rotation of the screw member thereby to force the web of the connector away from the web of the channel and the edges of the side walls of the connector locking engagement with the lips of the channel rigidly to secure the member to the channel. The thickness of the screw member is such that when the connector is in locking engagement with the channel, the other end face of the screw member does not project substantially beyond the surface of the connecting wall opposite the web of the channel.

9 Claims, 7 Drawing Figures

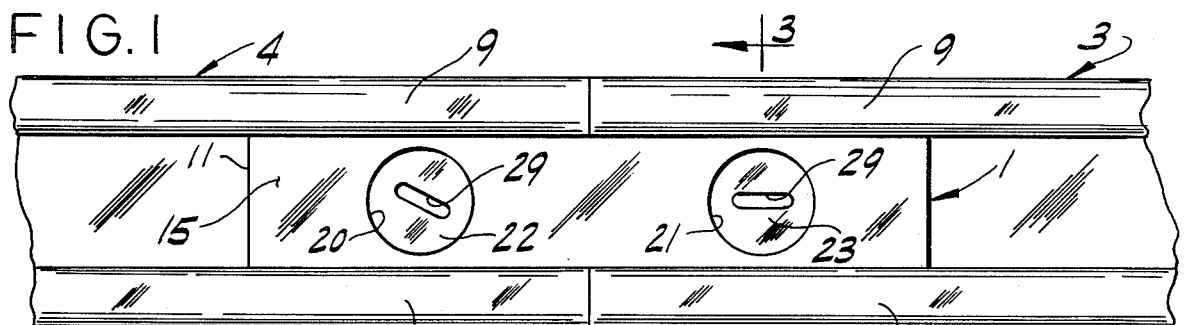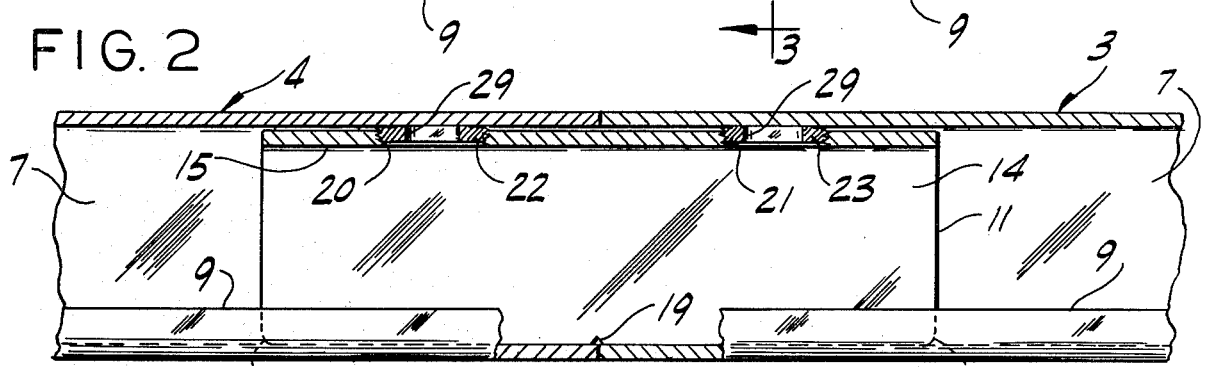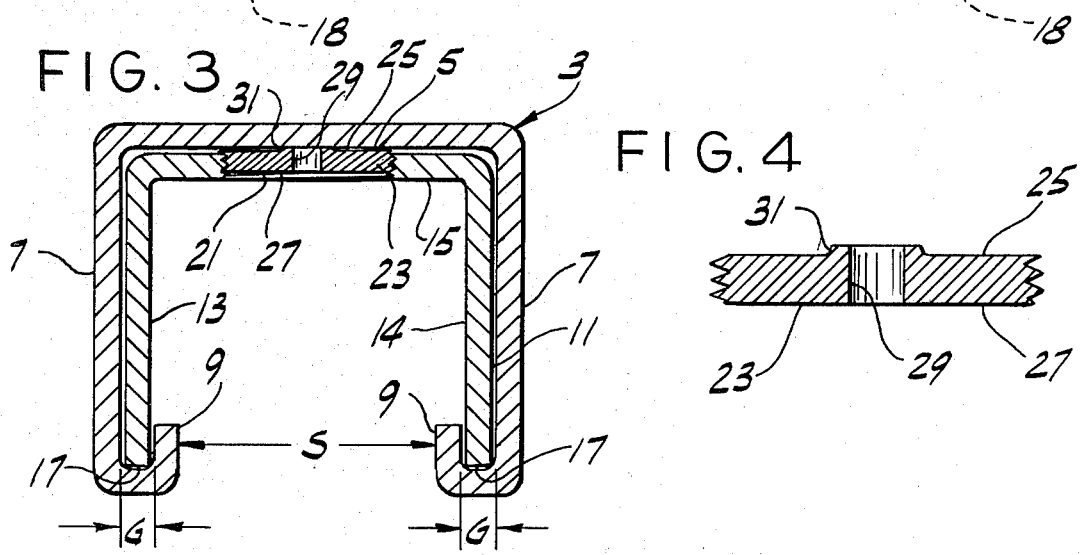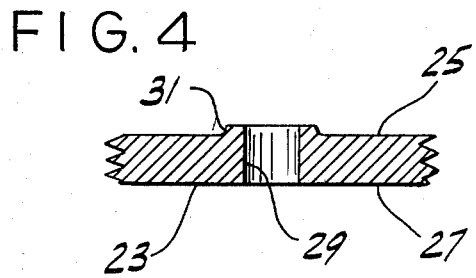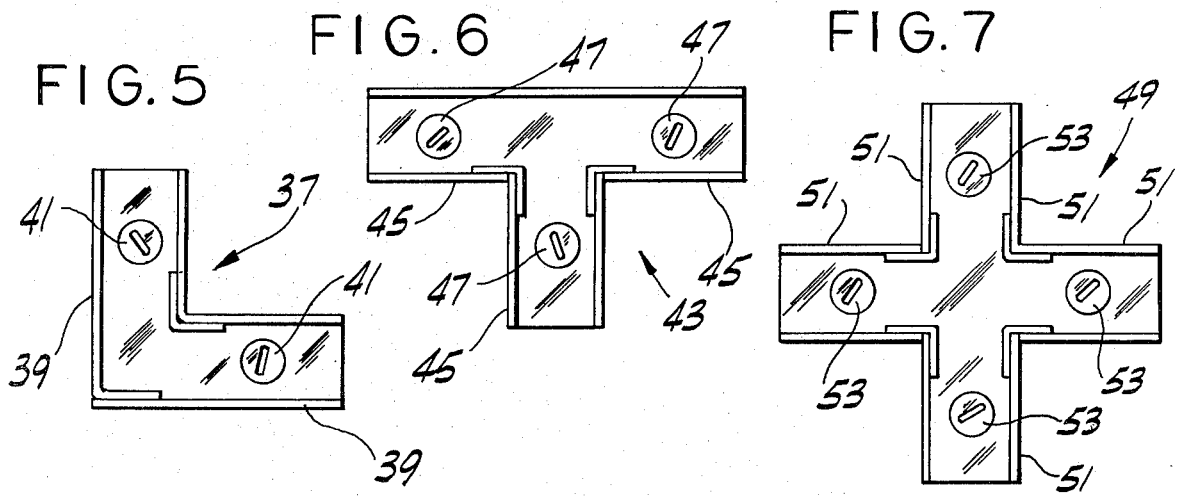

CONNECTOR

BACKGROUND OF THE INVENTION

This invention relates generally to connectors and more particularly to a connector for a U-shaped channel.

Electrical conduit, pipes, fixtures, etc. are commonly supported overhead or vertically by channel framing conventionally having side flanges with inwardly turned hook-shaped lips defining a slot therebetween. Heretofore, various means have been used to join sections of channel framing, but all have had certain disadvantages. For example, one such means is described in U.S. Pat. No. 3,900,269. It comprises a channel-shaped connector having two side walls and a connecting web, the latter having a pair of openings therein toward opposite ends of the web for threadably receiving two conventional fillister head screws. After a pair of channels to be joined are telescoped on opposite ends of the connector with the open side of the connector toward the channel slots and the side walls of the connector adjacent and parallel to the side walls of the channels, the screws are threaded into the holes until the shanks of the screws bear against the webs of the channels. Continued tightening of the screws moves the connector relative to the channels until the outer edges of the connector walls are jammed against the channel lips to lock the connector to the channel and thus the channels to each other. However, this type of connector has a disadvantage in that the exposed screw heads within the connector interfere with the use of the channels as a raceway for insulated wires and cable. Moreover, the screw heads may damage the insulation. A washer between each screw head and the connecting web of the connector alleviates this latter problem to some degree but further interferes with the use of the channels as a raceway. In addition, excessive tightening of the screws oftentimes results in cracking of the connector which is of cast metal.

SUMMARY OF THE INVENTION

Among the several objects of this invention may be noted the provision of an improved connector for channels; the provision of such a connector which may be quickly and easily installed in channels by means of readily available commercial tools; the provision of such a connector which provides a clear channel for safely carrying a maximum number of insulated wire and cables; the provision of such a connector which may be used with less risk of breaking the connector; the provision of such a connector which provides a superior electrical connection between connected channels; and the provision of such a connector which is economical to manufacture.

Briefly, an improved connector of this invention for a channel having a web and side flanges with inwardly turned lips defining a slot therebetween comprises a channel-shaped connecting member having a pair of opposed side walls with longitudinally extending edges and a connecting wall having a circular opening therein. The connector further comprises a relatively flat thin round screw member threaded in the opening and having opposing end faces of substantially the same diameter, the screw member being threaded substantially from one end face to the other for being threaded in said opening. The connecting member is axially inserted inside the channel with the open side of the member toward the channel slot to a position in which the side walls of the member are adjacent and generally parallel to the side flanges of the channel with the longitudinally extending edges of the side walls spaced from but adjacent to the lips of the channel, and in which the connecting wall of the member is adjacent and generally parallel to the web of the channel with the screw member in position for engagement of one end face thereof with the web of the channel on rotation of the screw member thereby forcing the web of the connector away from the web of the channel and the edges of the side walls of the connector into locking engagement with the lips of the channel rigidly to secure the member to the channel. Other objects and features will be in part apparent and in part pointed out hereinafter.

The thickness of the screw member is such that when the connector is in locking engagement with the channel, the other end face of the screw member does not project substantially beyond the surface of the connecting wall opposite the web of the channel.

BRIEF DESCRIPTION OF THE DRAWINGS

FIG. 1 is a plan of a pair of channels joined by a connector of this invention;

FIG. 2 is an elevation of FIG. 1 with portions being broken away and portions being shown in section to illustrate details;

FIG. 3 is a vertical section on line 3—3 of FIG. 1;

FIG. 4 is an enlarged sectional view of a portion of a screw member of the connector of this invention; and FIGS. 5-7 are plans of alternative connectors comprising connecting members of various shapes, each having threaded therein screw members identical to that shown in FIG. 4.

Corresponding reference characters indicate corresponding parts throughout the several views of the drawings.

DESCRIPTION OF A PREFERRED EMBODIMENT

Referring now to the drawings, a connector of this invention is indicated in its entirety at 1 and is shown joining a pair of channels, the right channel (as viewed in FIG. 1) being generally designated 3 and the left channel generally designated 4. These channels each comprise a web 5 and a pair of side flanges 7, the outer ends of which have inwardly directed lips formed thereon as indicated at 9. Each of these lips is hook-shaped for defining a groove G between the outer margin of the lip and a respective side flange 7. The lips 9 are spaced from one another to define a slot S therebetween which extends the entire length of each channel 3, 4.

The connector 1, which is preferably of 12-guage (about 0.10 inch or 2.64 mm) hot-rolled sheet steel or other suitable material, comprises a channel-shaped connecting member 11 having opposed left and right (as viewed in FIG. 3) side walls indicated at 13 and 14, respectively, and a connecting wall 15. The side walls 13, 14 have longitudinally extending edges 17 and the corners of the side walls at the ends of the connecting member are rounded, as indicated at 18 in FIG. 2. As shown, member 11 is sized for a relatively snug fit inside channels 3, 4. Thus with the open side of the member toward the channel slots S, the connecting wall 15 of member 11 is adjacent and parallel to the webs 5 of the channels and the side walls 13, 14 of the member are adjacent and parallel to the side flanges 7 of the channels, with the longitudinally extending edges 17 of the side walls 13, 14 received in grooves G. For reasons which will appear hereinafter, the edge 17 of side wall 14 is notched at its midpoint, as indicated at 19.

The connecting wall 15 of the connecting member 11 has a pair of circular openings therein toward opposite ends of the connecting member, the left opening (as viewed in FIG. 2) being designated 20 and the right 21. Two relatively thin flat round screw members designated 22 and 23 are threaded in these openings. As viewed in FIG. 3, each screw member has upper and lower opposing end faces 25, 27 which are of substantially the same diameter and are slightly smaller in diameter than the opening in which the screw member is threaded. The screw is threaded substantially from one end face to the other. For a connecting member 11 formed of 12-gauge steel (about 0.10 inch or 2.64 mm) the thickness of each screw member may be about 0.15 inch or 3.80 mm. The screw member, which is preferably of a harder material (e.g., cold-rolled steel) than that out of which the connecting member 11 is made, is large in diameter (e.g., 0.75 inch or 19.05 mm) in relation to its thickness and has a slot 29 therein for enabling it to be turned in its respective opening by the blade of a screwdriver or the like. The screw member is formed with a suitable number of threads per inch (e.g., 20).

As shown best in FIG. 4, the upper face of each screw member 22, 23 is raised around slot 29, forming an upwardly projecting protuberance 31 which bites into the web 5 of a respective channel when the screw member is rotated in its opening. This biting action ensures excellent electrical continuity between the connector 1 and the channel. Other means for accomplishing this biting action may also be suitable. For example, the upper face 25 of each screw member may be knurled.

In accordance with this invention, the connector 1 may be used to quickly and easily join the two channels 3, 4 shown in FIG. 2. Thus, with the right screw member 23 in a position in which its upper face 25 is generally flush with the upper face of the connecting wall 15 of the connecting member 11, the right end of the latter is axially inserted or slid inside the right channel 3 with the open side of the connecting member toward the channel slot S and edges 17 of side walls 13, 14 in grooves G formed by the hook-shaped lips 9. The fact that the corners of the side walls 13, 14 of the connecting member are rounded facilitates insertion of the connection member into the channel 3. The connecting member is slid into channel 3 until the notch 19 in the side wall 14 of the connecting member reaches a position in which it generally coincides with the left end of the right channel 3. The right screw member 23 is then rotated by means of a screwdriver, for example, to advance the screw member in opening 21 for engagement of the upper end face 25 of the screw member with the web 5 of the right channel 3. Continued rotation of the screw member forces the connecting wall 15 of the connecting member away from the web 5 of the channel, causing the longitudinally extending edges 17 of the side walls 13, 14 of the connecting member to jam in their respective grooves G against the lips 9 of the channel, thereby rigidly securing the connecting member to the channel.

Then, with the left screw member 22 in a position in which its upper face 25 is generally flush with the upper face of the connecting wall 15 of the connecting member 11, the left end of the connecting member is axially inserted inside the left channel 4 with the open side of the connecting member toward the channel slot S and the outer edges 19 of side walls 13, 14 of the member in grooves G formed by the hook-shaped lips 9 of the channel. Again, the insertion of the connecting member 11 into channel 4 is facilitated in that the corners of the side walls 13, 14 of the connecting member are rounded. The channel 4 is slid into the left end of the connecting member until it abuts the right end of channel 3, and the left screw member 22 is then rotated to bring the upper face 25 of the screw member into engagement with the web 5 of the left channel 4. The screw member is then rotated further, causing the longitudinally extending edges 17 of the side walls 13, 14 of the connecting member 11 to jam in grooves G against the lips 9 of channel 4 to secure the connecting member to the channel and thus the channels 3, 4 to each other.

It will be observed that the thickness of each screw member 22, 23 is such that when it is rotated to a position in which the connector is locked to a respective channel (FIG. 3), the lower end face 27 of the screw member is spaced slightly above the lower face of the connecting wall 15 of the connecting member, thus leaving the connecting member and channels 3, 4 clear for use as a raceway for insulated wires, cables, etc. It will of course be understood that each screw member could be somewhat thicker than shown in FIG. 3 so that its lower end face 27 is flush with or only slightly below the lower face of the connecting wall 15. However, it will be understood that the thickness of the screw member should be such that when the connector is in locking engagement with the channel, the inner end face of the screw does not project substantially beyond the surface of the connecting wall opposite the web of the channel, and thereby cannot interfere with the use of the channels as a raceway.

In view of the foregoing, it will be apparent that connector 1 of this invention may be quickly and easily installed by means of readily available tools (e.g., a screwdriver) to establish a rigid connection between a pair of channels. Moreover, the connector leaves the connected channels entirely clear for carrying an increased number of conductors therein. In addition, it will be observed that the connector provides a superior electrical connection between the channels, noting that the end faces 25 of the screw members are formed for biting into the webs 5 of the channels 3, 4 and further that the longitudinally extending edges 17 of the side walls 13, 14 of the connecting member are jammed against the lips 9 of the channels 3, 4 along the entire length of the connector. It will also be noted that the simple design of the connector enables economical manufacture thereof.

Although the connector 1 described above is designed only for straight splices, it will be understood that connectors of other configurations for different applications also fall within the scope of the invention. FIG. 5, for example, illustrates a generally L-shaped connector 37 having two legs, each designed 39, for joining a pair of channels generally at right angles to one another. Threaded in the connecting walls of these legs are screw members, each indicated at 41, identical in structure and operation to screw members 22 and 23 heretofore described. For rigidly joining three channels, FIG. 6 shows a generally T-shaped connector 43 having three legs, each indicated at 45. Indicated at 47 and threadably mounted in the connecting walls of the legs 45 are screw members, also identical in construction and operation to screw members 22 and 23 described hereinabove. And for joining four connectors, a generally cross-shaped connector is indicated generally at 49 in FIG. 7. This connector has four legs 51 having screw members 53 mounted in the connecting walls. These screw members 53 are also identical to screw members 22 and 23.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A connector for a channel having a web and side flanges with inwardly turned lips defining a slot therebetween, said connector comprising a channel-shaped connecting member having a pair of opposed side walls with longitudinally extending edges and a connecting wall having a circular opening therein, a relatively flat thin round screw member threaded in said opening and having opposing end faces of substantially the same diameter, said screw member being threaded substantially from one end face to the other for being threaded in said opening, said connecting member being adapted to be axially inserted inside the channel with the open side of the member toward the channel slot to a position in which the side walls of the member are adjacent and generally parallel to the side flanges of the channel with the longitudinally extending edges of the side walls spaced from but adjacent to said lips of the channel, and in which the connecting wall of the member is adjacent and generally parallel to the web of the channel with the screw member in position for engagement of one end face thereof with the web of the channel on rotation of the screw member thereby to force the connecting wall of the connecting member away from the web of the channel and said edges of the side walls of the connector into locking engagement with the lips of the channel rigidly to secure the member to the channel, the thickness of said screw member being such that when said connector is in locking engagement with said channel, the other end face of the screw member does not project substantially beyond the surface of said connecting wall opposite the web of the channel to provide a clear channel for safely carrying a maximum number of insulated wires and cables.

2. A connecting member as set forth in claim 1 wherein said screw member is relatively thin, having a thickness which is relatively small in relation to its diameter.

3. A connecting member as set forth in claim 1 further comprising means on said one end face of the screw member for biting into said web of the channel when the screw member is rotated.

4. For rigidly connecting a pair of channels in an in-line relationship, a connector as set forth in claim 1 wherein said connecting wall has a pair of circular openings therein toward opposite ends of the connecting member, each of said openings having an aforesaid screw member threaded therein.

5. For rigidly joining a pair of channels, a connector as set forth in claim 1 wherein said connecting member is generally L-shaped, having two legs, each of which has an aforesaid screw member threaded in an opening in the connecting wall of the leg.

6. For rigidly joining three channels, a connector as set forth in claim 1 wherein said connecting member is generally T-shaped, having three legs, each of which has an aforesaid screw member threaded in an opening in the connecting wall of the leg.

7. For rigidly joining four channels, a connector as set forth in claim 1 wherein said connecting member is of generally cruciform shape, having four legs, each of which has an aforesaid screw member threaded in an opening in the connecting wall of the leg.

8. A connector for a channel having a web and side flanges with inwardly turned lips defining a slot therebetween, said connector comprising a channel-shaped connecting member having a pair of opposed side walls with longitudinally extending edges and a connecting wall having a circular opening therein, a relatively flat thin round screw member threaded in said opening and having opposing end faces of substantially the same diameter, said screw member being threaded substantially from one end face to the other for being threaded in said opening, said connecting member being adapted to be axially inserted inside the channel with the open side of the member toward the channel slot to a position in which the side walls of the member are adjacent and generally parallel to the side flanges of the channel with the longitudinally extending edges of the side walls spaced from but adjacent to said lips of the channel, and in which the connecting wall of the member is adjacent and generally parallel to the web of the channel with the screw member in position for engagement of one end face thereof with the web of the channel on rotation of the screw member thereby to force the connecting wall of the connecting member away from the web of the channel and said edges of the side walls of the connector into locking engagement with the lips of the channel rigidly to secure the member to the channel, the thickness of said screw member being such that when said connector is in locking engagement with said channel, the other end face of the screw member does not project substantially beyond the surface of said connecting wall opposite the web of the channel, said screw member having a slot therein.

9. A connector for a channel having a web and side flanges with inwardly turned lips defining a slot therebetween, said connector comprising a channel-shaped connecting member having a pair of opposed side walls with longitudinally extending edges and a connecting wall having a circular opening therein, a relatively flat thin round screw member threaded in said opening and having opposing end faces of substantially the same diameter, said screw member being threaded substantially from one end face to the other for being threaded in said opening, said connecting member being adapted to be axially inserted inside the channel with the open side of the member toward the channel slot to a position in which the side walls of the member are adjacent and generally parallel to the side flanges of the channel with the longitudinally extending edges of the side walls spaced from but adjacent to said lips of the channel, and in which the connecting wall of the member is adjacent and generally parallel to the web of the channel with the screw member in position for engagement of one end face thereof with the web of the channel on rotation of the screw member thereby to force the connecting wall of the connecting member away from the web of the channel and said edges of the side walls of the conenctor into locking engagement with the lips of the channel rigidly to secure the member to the channel, the thickness of said screw member being such that when said connector is in locking engagement with said channel, the other end face of the screw member does not project substantially beyond the surface of said connecting wall opposite the web of the channel, and an end of said connecting member being formed for facilitating insertion of the connecting member into said channel.

* * * * *